United States Patent [19]

Hoaglin

[11] 4,023,302
[45] May 17, 1977

[54] LEADER AND DROPPER FOR FISHING LINES

[76] Inventor: Dennis C. Hoaglin, 12 Upper Fremont, San Rafael, Calif. 94901

[22] Filed: Jan. 21, 1976

[21] Appl. No.: 650,924

[52] U.S. Cl. .............................................. 43/42.74
[51] Int. Cl.² ........................................ A01K 91/00
[58] Field of Search ........... 43/42.74, 44.84, 44.85, 43/44.9, 44.91

[56] References Cited
UNITED STATES PATENTS

| | | | |
|---|---|---|---|
| 2,929,168 | 3/1960 | Furuto | 43/44.84 |
| 3,067,538 | 12/1962 | Hines | 43/42.74 |
| 3,650,063 | 3/1972 | Pierce | 43/42.74 |

*Primary Examiner*—Warner H. Camp
*Attorney, Agent, or Firm*—Gordon Wood

[57] ABSTRACT

A dropper is secured to a leader by a swivel connection with the inner end of the dropper rigidly secured to the connector so that the hook end of the dropper is spaced horizontally outwardly from the leader to obviate snagging of the hook on the leader and to prevent entanglement of the dropper and the leader.

3 Claims, 4 Drawing Figures

LEADER AND DROPPER FOR FISHING LINES

This invention relates to fishing line leaders incorporating droppers to permit hooking a plurality of fish at one drop.

In fishing for deep water fish such a rock cod it is customary to connect a plurality of droppers or snelled hooks to the leader to catch a plurality of fish with one drop.

In order to minimize entanglement of the droppers with the leader the connections to the leader have heretofore been in the form of swivels which permit the droppers to swing around the leader by virtue of the rotatable connection. In this manner a hooked fish is permitted to swim around the leader without causing undesirable entanglement.

However, such prior art swivel connections are made so that the dropper or snelled hook hangs downwardly alongside the vertically disposed leader, thus permitting the entanglement which the swivelled connection is intended to obviate.

The main object of the present invention is the provision of a leader and dropper combination in which the dropper is connected to the leader in such a manner as to minimize entanglement of the dropper or its hook with the leader.

Another object of the invention is the provision of a connector between a dropper and a leader which permits a hooked fish to swim about the leader without causing entanglement and at the same time reduce the likelihood of engagement of the dropper with the leader before the fish is hooked.

Other objects and advantages will be apparent from the following specification and from the drawings.

Figure 1:
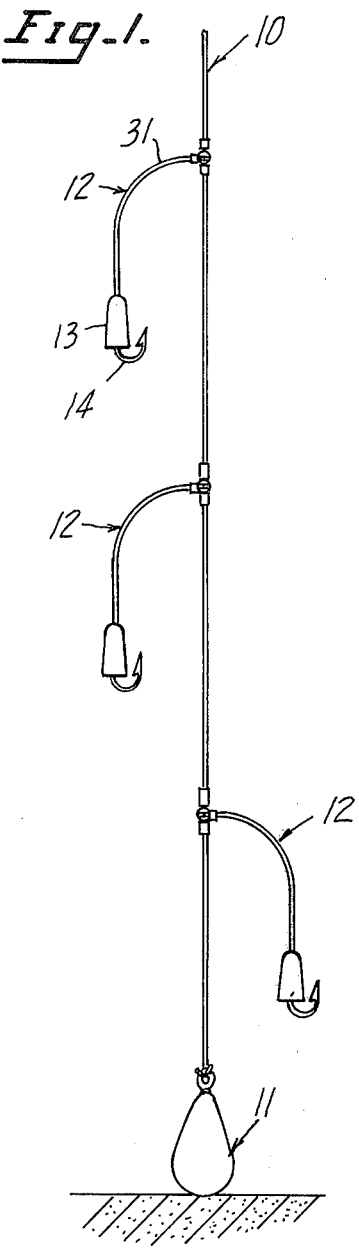
FIG. 1 is a semischematic side view of a leader with three droppers connected thereto.

In FIG. 1 the general configuration of the lower end of the leader is shown as customarily used in deep water fishing for fish such as rock cod. The leader generally designated 10 is provided at its lower end with a sinker 11 for holding the leader in the vertical position. A plurality of droppers generally designated 12 are indicated, each of said droppers being provided with a bait or lure 13 and a hook 14.

Figure 2:
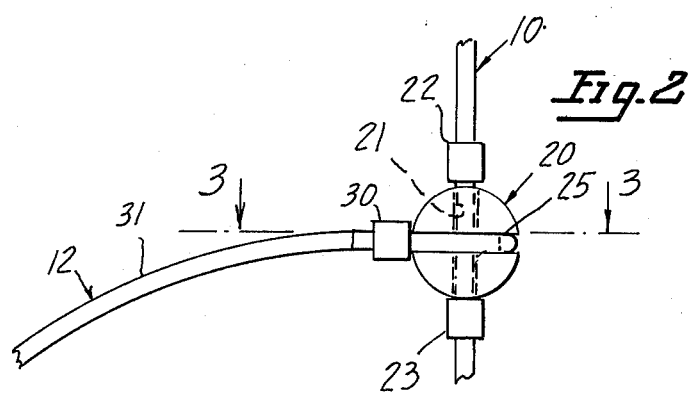
FIG. 2 is a greatly enlarged fragmentary side elevation of the leader showing the dropper and the connector by which it is secured to the leader.
Figure 3:
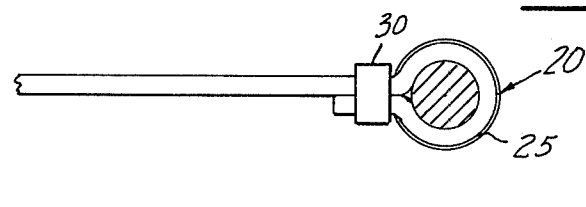
FIG. 3 is a horizontal cross section through the structure of FIG. 2 on line 3—3 thereof.

In the embodiment shown in FIGS. 2, 3 the dropper 12 is secured to a generally spherical lure bead generally designated 20 which is formed with a through bore 21 for slidably receiving therethrough the leader 10. The lure bead 20 is held against longitudinal movement relative to the leader 10 by means of a pair of upper and lower sleeves 22, 23 which are clamped to the leader 10 by special pliers in a manner well known in the art.

By the present invention the lure bead 20 is provided with a circumferentially extending slot 25 which is in a plane at right angles to the bore 21.

The inner end of dropper 12 is wrapped around the bead 20 within the groove 25 as best seen in FIG. 3 and is tightly secured to the bead 20 by means of clamp 30 which is similar to clamps 22, 23 above described. This has the effect of creating a rigid connection between the dropper 12 and the bead 20 so that the dropper normally is disposed in the manner shown in FIG. 1 and FIG. 3, that is, the dropper extends horizontally outwardly for a portion of its length and the weight of the bait 13 and the hook 14 causes the dropper to assume an arcuate shape 31 (FIG. 1) in which the weight of the bait 13 and hook 14 is resisted by the inherent resiliency of the dropper itself. By this structure it will be apparent that with the droppers disposed as shown in FIG. 1 there is less likelihood of a dropper being entangled with the leader 10 and there is also less likelihood of the hook 14 becoming snagged on the leader, thereby reducing the likelihood of a fish being hooked.

It will be apparent that the bead 20, although spherical in the drawings, may be of any desired shaped and, in effect, is a sleeve permitting rotation of the dropper about the leader. In fact, the bead 20 could be a cylindrical sleeve having a length substantially greater than the diameter of bore 21. In the case of bead 20 the length of bore 21 should be at least five times its diameter to insure that the groove 25 is not tilted from a substantially horizontal plane in order to achieve the configuration shown in FIG. 1.

The above described structure thus distinguishes from the conventional structure which employs a swivel at the inner end of the dropper but which permits the dropper to hang vertically downwardly alongside the leader 10 thereby increasing the possibility of snagging and entanglement.

Figure 4:
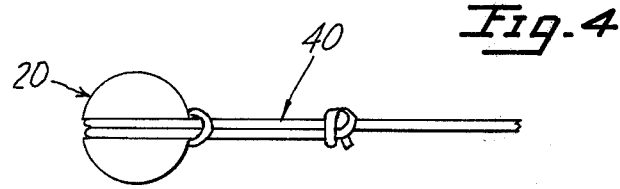
FIG. 4 is a view similar to FIG. 2 showing a modified form of the invention.

The provision of the groove 25 also permits the use of the invention with a snelled hook generally designated 40 in FIG. 4. In this case the substantially rigid connection between the snelled hook (or dropper) may be made by encircling the bead 20 at the groove 25 with the loop of the snelled hook and tightening the same to the bead 20 as seen in FIG. 4. It will be apparent that although the rigidity of the connection between the snelled hook 40 of FIG. 4 is not as great as the rigidity of the connection in FIGS. 2, 3, nevertheless the connection is strong enough so that the strand of the snelled hook 40 assumes essentially the same position as the dropper 12, as seen in FIG. 1.

I claim:

1. In a leader for a fishing line,
  a dropper having an inner end portion adjacent said leader and an outer hook end,
  a connector securing said inner end portion of said dropper to the leader,
  said connector being formed with an elongated hole adapted to slidably receive said leader therethrough for rotatably supporting said dropper on said leader,
  said connector being formed with a circumferentially extending groove in a plane substantially at right angles to the length of said hole,
  said inner end portion of said dropper being formed with a loop snugly received in said groove, and
  means rigidly securing said loop within said groove.

2. A leader according to claim 1 wherein said means is a clamp.

3. A leader according to claim 1 wherein said dropper is a snelled hook with the loop of the snell received in said groove.

* * * * *